United States Patent [19]
Matsushita et al.

[11] Patent Number: 5,399,602
[45] Date of Patent: Mar. 21, 1995

[54] OIL-RESISTANT SILICONE RUBBER COMPOSITION

[75] Inventors: Takao Matsushita; Yasumichi Shigehisa, both of Chiba, Japan

[73] Assignee: Dow Corning Toray Silicone, Co. Ltd., Tokyo, Japan

[21] Appl. No.: 283,340

[22] Filed: Aug. 1, 1994

Related U.S. Application Data

[62] Division of Ser. No. 127,913, Sep. 28, 1993.

[30] Foreign Application Priority Data

Sep. 28, 1992 [JP] Japan .................................. 4-282532

[51] Int. Cl.⁶ ................................................. C08K 5/54
[52] U.S. Cl. .................................... 524/267; 524/268; 524/588; 524/731; 524/861; 524/862; 528/15; 528/24; 528/42
[58] Field of Search .......................... 528/15, 24, 42; 524/267, 268, 588, 731, 861, 862

[56] References Cited

U.S. PATENT DOCUMENTS 4,122,247 10/1978 Evans ...................................... 528/18
4,386,170 5/1983 Monroe ................................ 525/102

*Primary Examiner*—Melvyn I. Marquis
*Attorney, Agent, or Firm*—William F. Boley

[57] ABSTRACT

The composition of the present invention comprises an oil-resistant silicone rubber composition that undergoes little swelling even when used in regular or continuous contact with mineral oil-based lubricating oil such as engine oil and so forth. The oil-resistant silicone rubber composition comprises:

(A) a dimethylsiloxane-3,3,3-trifluoropropylmethylsiloxane-methylvinylsiloxane copolymer gum that contains 0.001 to 5 mole percent methylvinylsiloxane unit, (B) a hydrocarbon oil or diorganopolysiloxane oil wherein the total in each diorganopolysiloxane oil molecule of the number of silicon-bonded hydrogen atoms and the number of functional groups reactive with component (A) or (C) is less than two, (C) a reinforcing filler, and (D) a curing agent in a quantity sufficient to cure the composition.

8 Claims, No Drawings

OIL-RESISTANT SILICONE RUBBER COMPOSITION

This is a divisional of copending application Ser. No. 08/127,913, filed on Sep. 28, 1993, pending.

The present invention relates to an oil-resistant silicone rubber composition. More specifically, the invention relates to an oil-resistant silicone rubber composition that undergoes little swelling even when used in regular or continuous contact with a mineral oil-based lubricating oil such as, for example, engine oil and so forth.

BACKGROUND OF INVENTION

Silicone rubbers have entered into use in a wide variety of applications because they have excellent heat resistance and cold resistance and a low compression set. However, silicone rubbers generally have poor oil resistance and are therefore unqualified for use in applications that require oil resistance, for example, as rocker cover gaskets, oil packings, valve stem seals, oil filters, seal rings, shaft seals, etc., in automobiles, other types of vehicles, ships, airplanes, etc. In particular, when silicone rubber is employed in regular or continuous contact with a mineral oil-based lubricating oil such as engine oil, etc., or low-viscosity oil or fuel oil, the silicone rubber swells and fissures or cracks develop in it during long-term service. In response to this, Japanese Patent Application Laid Open (Kokai or Unexamined) Number Hei 1-203467 (203,467/1989) has proposed a silicone rubber that is based on a dimethylsiloxane 3,3,3-trifluoropropylmethylsiloxane copolymer gum. This dimethylsiloxane-3,3,3-trifluoropropylmethylsiloxane copolymer gum corresponds to a dimethylpolysiloxane gum (a primary component of silicone rubber) in which the methyl groups have been replaced in part with 3,3,3-trifluoropropyl groups. However, this dimethylsiloxane-3,3,3 -trifluoropropyhnethylsiloxane copolymer gum does not solve the problems described above.

The inventors achieved the present invention as the result of extensive investigations directed at solving the problems described above.

SUMMARY OF INVENTION

The present invention takes as its object the introduction of an oil-resistant silicone rubber composition that after curing does not suffer from a decline in functionality even when used in regular or continuous contact with mineral oil-based lubricating oil (engine oil, etc.) and is therefore tolerant of long-term service.

The present invention relates to an oil-resistant silicone rubber composition, comprising:
(A) 100 weight parts dimethylsiloxane-3,3,3 -trifluoropropylmethylsiloxane-methylvinylsiloxane copolymer gum containing methyvinylsiloxane unit in a range of about 0.001 to 5 mole percent,
(B) 1 to 80 weight parts of an oil selected from a group consisting of hydrocarbon oil and diorganopolysiloxane oil, wherein the total in each diorganopolysiloxane oil molecule of the number of silicon-bonded hydrogen atoms and the number of functional groups that are reactive with component (A) or (C) is less than two,
(C) 10 to 100 weight parts reinforcing filler, and
(D) a curing agent in a quantity sufficient to cure the composition.

DETAILED DESCRIPTION OF INVENTION

The present invention relates to an oil-resistant silicone rubber composition, comprising:
(A) 100 weight parts dimethylsiloxane-3,3,3-trifluoropropylmethylsiloxane-methylvinylsiloxane copolymer gum containing methylvinylsiloxane unit in a range of about 0.001 to 5 mole percent,
(B) 1 to 80 weight parts of an oil selected from a group consisting of hydrocarbon oil and diorganopolysiloxane oil, wherein the total in each diorganopolysiloxane oil molecule of the number of silicon-bonded hydrogen atoms and the number of functional groups that are reactive with component (A) or (C) is less than two,
(C) 10 to 100 weight parts reinforcing filler, and
(D) a curing agent in a quantity sufficient to cure the composition.

The dimethylsiloxane-3,3,3-trifluoropropylmethylsiloxane-methylvinylsiloxane copolymer gum comprising the component (A) of the present invention is the main or base component of the composition of the present invention. It is composed of the dimethylsiloxane unit, the 3,3,3-trifluoropropylmethylsiloxane unit, and the methylvinylsiloxane unit wherein the methylvinylsiloxane unit comprises about 0.001 to 5 mole percent of the total units. The 3,3,3-trifluoropropylmethylsiloxane unit preferably comprises 5 to 95 mole percent of the total units. The molecular structure of this copolymer gum component may be straight chain or branch-containing straight chain. The minimum viscosity of this copolymer gum is in a range of about 300,000 centistokes. The minimum viscosity of this copolymer gum is preferably in a range of about 1,000,000 centistokes. Examples of the molecular chain end groups of this copolymer gum component include trimethylsiloxy, dimethylvinylsiloxy, hydroxydimethylsiloxy, hydroxy(3,3,3-trifluoropropyl)methylsiloxy, and similar groups.

The oil comprising component (B) of the instant invention is the component that characterizes the invention. The oil comprising component (B) functions to inhibit swelling of the silicone rubber during its contact with mineral oil-based lubricating oil such as engine oil, etc. The total of the number of silicon-bonded hydrogens and the number of functional groups that are reactive with component (A) or (C) in each molecule of the diorganopolysiloxane oil is less than two. Examples of said functional groups include alkenyl, alkoxy, hydroxyl, amino, mercapto, carboxyl, and so forth.

This oil component may comprise only diorganopolysiloxane oil as described below, only hydrocarbon oil as described below, or a mixture of diorganosiloxane oil and hydrocarbon oil. The total quantity of the oil component should fall in the range of 1 to 80 weight parts per 100 weight parts of component (A), and preferably falls in a range of 5 to 50 weight parts per 100 weight parts of component (A). In addition, it is also preferred that the quantity of this oil component be in a range of about 4 to 20 weight percent of this composition of the instant invention. The basis for this is as follows: the effect of the present invention, though present, is not fully developed at below 4 weight percent, while at greater than 20 weight percent there is extremely poor workability.

Examples of the diorganopolysiloxane oil comprising component (IB) include trimethylsiloxy-terminated dimethylpolysiloxanes, trimethylsiloxy-terminated methyloctylpolysiloxanes, trimethylsiloxy-terminated methylphenylpolysiloxanes, trimethylsiloxy-terminated 3,3,3-trifluoropropylmethylpolysiloxanes, copolymers containing these siloxane units, and mixtures of two or more species of these diorganopolysiloxane oils. Among the preceding, trimethylsiloxy-terminated dimethylpolysiloxane oils are preferred from the standpoints of economics and post-molding stability.

The viscosity of this diorganopolysiloxane oil is not specifically restricted, but preferably falls in the range of 1 to 200,000 centipoise at 25° C. based on considerations of the stability of the silicone rubber composition and the degree of swelling when challenged by mineral oil-based lubricating oil.

In terms of molecular structure, the hydrocarbon oil which also comprises component (B) includes paraffinic hydrocarbon oils, naphthenic hydrocarbon oils, aromatic hydrocarbon oils, and similar oils, but the nature of the hydrocarbon oil is not specifically restricted. While the viscosity of this hydrocarbon oil is also not specifically restricted, its viscosity preferably falls in the range of 1 to 200,000 centipoise at 25° C. based on considerations of the stability of the silicone rubber composition and the degree of swelling when challenged by mineral oil-based lubricating oil. The workability is very poor at below 1 centipoise while substantial swelling occurs at values in excess of 200,000 centipoise.

The reinforcing filler comprising the component (C) used in the invention may be any reinforcing filler heretofore used in silicone rubbers. An example of this reinforcing filler is microparticulate silica, and in turn, examples of microparticulate silica include fumed silica and precipitated silica. Preferred among these microparticulate silicas are ultramicroparticulate silicas with particle sizes below 50 millimicrons and surface areas of at least 100 $m^2/g$. Also operable for this reinforcing filler component are microparticulate silicas whose surfaces have been treated with organosilane, organosilazane, diorganocyclopolysiloxane, and so forth. The reinforcing filler component should be added at 10 to 100 weight parts per 100 weight parts component (A). The curing agent comprising component (D) of the present invention encompasses organoperoxides and organohydrogenpolysiloxane/addition reaction catalyst combinations. The organoperoxides encompassed by this component are exemplified by 2,5-dimethyl-2,5-di(tert-butylperoxy)hex-3-yne, 2,5-dimethyl-2,5-di(tert-butylperoxy)hexane, 2,2'-bis(tert-butylperoxy)-p-diisopropylbenzene, dicumyl peroxide, di-tert-butyl peroxide, tert-butyl perbenzoate, 1,1-bis(-tert-butylperoxy)-3,3,5-trimethylcyclohexane, 2,4-dichlorobenzoyl peroxide, benzoyl peroxide, p-chlorobenzoyl peroxide, and similar compounds.

With regard to the organohydrogenpolysiloxane/addition reaction catalyst combinations comprising this component, the organohydrogenpolysiloxane must contain at least 3 silicon-bonded hydrogens in each molecule. Examples of said organohydrogenpolysiloxane include trimethylsiloxy-terminated dimethylsiloxane-methylhydrogensiloxane copolymers, hydrogendimethylsiloxy-terminated dimethylsiloxane-methylhydrogensiloxane copolymers, and so forth. The molecular structure of this organohydrogenpolysiloxane may be straight chain, branched, or cyclic, and its degree of polymerization should be at least 2. This organohydrogenpolysiloxane is preferably added so as to give 0.6 to 5.0 moles silicon-bonded hydrogen per 1 mole silicon-bonded alkenyl group in component (A). Examples of the addition reaction catalyst used in combination with the above-described organohydrogenpolysiloxane include platinum and platinum compound catalysts, as for example, platinum black, chloroplatinic acid, platinum tetrachloride, chloroplatinic acid/olefin complexes, chloroplatinic acid/methylvinylsiloxane complexes, and similar compounds; microparticulate thermoplastic catalyst that contains platinum or platinum compound catalyst as described above; rhodium compounds; and cobalt carbonyl. This addition reaction catalyst should be added in a catalytic quantity, which is generally in the range of 0.1 to 100 weight parts for each 1 million weight parts component (A).

While the composition of the present invention comprises the components (A) through (D) as described above, in addition to these components it may also contain, insofar as the object of the present invention is not impaired, the various additives heretofore known for addition to silicone rubber compositions. Examples of these additives include nonreinforcing fillers, pigments, heat stabilizers, flame retardants, internal release agents, plasticizers, and so forth. Examples of the nonreinforcing fillers include diatomaceous earth, quartz powder, calcium carbonate, mica, aluminum oxide, magnesium oxide, titanium oxide, and so forth. Examples of the pigments include carbon black, red iron oxide, and so forth, and examples of the heat stabilizers include the rare earth oxides, rare earth hydroxides, cerium silanolate, the fatty acid salts of cerium, and so forth.

The composition of the instant invention is readily prepared by mixing the aforementioned components (A) through (D) and any optional additives to homogeneity using a known mixing means such as a two-roll mill or kneader mixer.

Highly oil-resistant silicone rubber moldings can be produced from the composition of the present invention by known molding methods, such as compression molding, injection molding, and transfer molding, by heating for several seconds to several minutes at a temperature in a range of about 50° C. to 250° C.

Because the oil-resistant silicone rubber composition of the present invention comprises components (A) through (D) and in particular because its component (B) comprises hydrocarbon oil or diorganopolysiloxane oil where the sum in each oil molecule of the number of silicon-bonded hydrogen atoms and the number of functional groups that are reactive with component (A) or (C) is less than two, this oil-resistant silicone rubber composition characteristically exhibits a low degree of swelling even when used in regular or continuous contact with mineral oil-based lubricating oil such as engine oil and so forth.

The following examples are included for illustrative purposes only and should not be construed as limiting the invention set forth in the claims. In these examples, part means weight part and the viscosity is the value measured at 25° C. The physical properties and degree of swelling of the individual silicone rubber compositions were measured by the methods stipulated in JIS K 6301. The mineral oil used in the examples was the Test Oil No. 3 stipulated for the immersion test of JIS K 6301.

Example 1

One hundred parts dimethylvinylsiloxy-terminated diorganopolysiloxane copolymer gum (average molecular weight=540,000) comprising 79.86 mole percent dimethylsiloxane unit, 19.97 mole percent 3,3,3-trifluoropropylmethylsiloxane unit, and 0.17 mole percent methylvinylsiloxane unit was mixed with 55 parts fumed silica having a surface area of 200 m²/g, 10 parts dimethylhydroxysiloxy-terminated dimethylpolysiloxane having a viscosity of 20 centipoise (surface treatment agent for the silica), and 2 parts alpha, omega-dihydroxymethylvinylpolysiloxane having a viscosity of 35 centipoise. This was followed by the addition with mixing to homogeneity of 20 parts trimethylsiloxy-terminated dimethylpolysiloxane oil having a viscosity of 50 centipoise. A base compound was prepared by heating this mixture for 2 hours at 170° C. Then, 0.3 parts 2,5-dimethyl-2,5-di(tert-butylperoxy)hexane was added to each 100 parts of this base compound with mixing on a two-roll mill to yield the oil-resistant silicone rubber composition. This composition was compression molded at 170° C. for 10 minutes to give rubber sheet as stipulated in JIS K 6301 (dumbbell pattern no. 3), and the physical properties of this rubber sheet were measured. This rubber sheet was also immersed in the mineral oil at 150° C. for 70 hours, and its physical properties and degree of swelling were then measured. The results are reported in Table 1 below.

Example 2

Silicone rubber sheet was prepared as in Example 1, but in this case using 20 parts trimethylsiloxy-terminated methylphenylsiloxane-dimethylsiloxane copolymer oil (viscosity of 130 centipoise) comprising 75 mole percent methylphenylsiloxane unit and 25 mole percent dimethylsiloxane unit in place of the 20 parts trimethylsiloxy-terminated dimethylpolysiloxane oil (viscosity of 50 centipoise) used in Example 1. The properties of this silicone rubber sheet were measured as in Example 1, and these results are reported in Table 1 below.

Example 3

Silicone rubber sheet was prepared as in Example 1, but in this case using 10 parts paraffinic hydrocarbon oil (brand name: Process Oil PW-380, from Idemitsu Kosan Kabushiki Kaisha, Tokyo-to, Japan) in place of the 20 parts trimethylsiloxy-terminated dimethylpolysiloxane oil (viscosity of 50 centipoise) used in Example 1. The properties of this silicone rubber sheet were measured as in Example 1, and these results are reported in Table 1 below.

Example 4

Silicone rubber sheet was prepared as in Example 1, but in this case using 100 parts dimethylvinylsiloxy-terminated diorganopolysiloxane copolymer gum (average molecular weight of 580,000) comprising 64.89 mole percent dimethylsiloxane unit, 34.94 mole percent 3,3,3-trifluoropropylmethylsiloxane unit, and 0.17 mole percent methylvinylsiloxane unit in place of the 100 parts dimethylvinylsiloxy-terminated diorganopolysiloxane copolymer gum (average molecular weight of 540,000) comprising 79.86 mole percent dimethylsiloxane unit, 19.97 mole percent 3,3,3-trifluoropropylmethylsiloxane unit, and 0.17 mole percent methylvinylsiloxane unit that was used in Example 1. The properties of this silicone rubber sheet were measured as in Example 1, and these results are reported in Table 1 below.

Comparison Example 1

Silicone rubber sheet was prepared as in Example 1, but in this case omitting the 20 parts trimethylsiloxy-terminated dimethylpolysiloxane oil (viscosity of 50 centipoise) that was used in Example 1. The properties of this silicone rubber sheet were measured as in Example 1, and these results are reported in Table 1 below.

Comparison Example 2

Silicone rubber sheet was prepared as in Example 1 using dimethylvinylsiloxy-terminated diorganopolysiloxane copolymer gum (average molecular weight of 400,000) composed of 99.87 mole percent dimethylsiloxane unit and 0.13 mole percent methylvinylsiloxane unit in place of the 100 parts dimethylvinylsiloxy-terminated diorganopolysiloxane copolymer gum (average molecular weight of 540,000) comprising 79.86 mole percent dimethylsiloxane unit, 19.97 mole percent 3,3,3-trifluoropropylmethylsiloxane unit, and 0.17 mole percent methylvinylsiloxane unit that was used in Example 1. The properties of this silicone rubber sheet were measured as in Example 1, and these results are reported in Table 1 below.

TABLE I

|  | degree of swelling | hardness before oil immersion | hardness after oil immersion |
| --- | --- | --- | --- |
| Example 1 | +6 | 60 | 52 |
| Example 2 | +10 | 75 | 61 |
| Example 3 | +13 | 75 | 53 |
| Example 4 | +2 | 76 | 71 |
| Comparison Example 1 | +18 | 73 | 55 |
| Comparison Example 2 | +26 | 67 | 50 |

We claim:

1. An oil-resistant silicone rubber composition, comprising:
    (A) 100 weight parts dimethylsiloxane-3,3,3-trifluoropropylmethylsiloxane-methylvinylsiloxane copolymer gum containing methylvinylsiloxane units in a range of about 0.001 to 5 mole percent,
    (B) 1 to 80 weight parts of a diorganopolysiloxane oil per 100 weight parts of component (A), wherein the total in each molecule of the diorganopolysiloxane oil of the number of silicon-bonded hydrogen atoms and the number of functional groups that are reactive with component (A) or (C) is less than two,
    (C) 10 to 100 weight parts reinforcing filler per 100 weight parts of component (A), and
    (D) a curing agent in a quantity sufficient to cure the composition.

2. An oil-resistant silicone rubber composition according to claim 1, wherein the curing agent is an organohydrogenpolysiloxane/addition reaction catalyst combination.

3. An oil-resistant silicone rubber composition according to claim 2, wherein the diorganopolysiloxane oil is selected from a group consisting of trimethylsiloxy-terminated dimethylpolysiloxane, trimethylsiloxy-terminated methyloctylpolysiloxane, trimethylsiloxy-terminated methylphenylpolysiloxane, trimethylsiloxy-terminated 3,3,3-trifluoropropylmethylpolysiloxane, and trimethylsiloxy-terminated copolymer oil having units selected from a group consisting of dimethylsiloxane, methyloctylsiloxane, methylphenylsiloxane, and 3,3,3-trifluoropropylmethylsiloxane units; the quantity of diorganopolysiloxane oil is in a range of about 5 to 50 weight parts per 100 weight parts of component (A); and the diorganopolysiloxane oil comprises a weight percent of the composition in a range of about 4 to 20.

4. An oil-resistant silicone rubber composition according to claim 3, wherein the diorganopolysiloxane oil is selected from a group consisting of trimethylsiloxy-terminated dimethylpolysiloxane and trimethylsiloxy-terminated dimethylsiloxane-methylphenylsiloxane copolymer oil.

5. An oil-resistant silicone rubber composition according to claim 3, wherein 3,3,3-trifluoropropylmethylsiloxane units comprise a mole percent of the dimethylsiloxane-3,3,3-trifluoropropylmethylsiloxane-methylvinylsiloxane copolymer gum in a range of about 5 to 95; molecular chain end groups of the dimethylsiloxane-3,3,3-trifluoropropylmethylsiloxane-methylvinylsiloxane copolymer gum are selected from a group consisting of trimethylsiloxy, dimethylvinylsiloxy, hydroxydimethylsiloxy, and hydroxy(3,3,3-trifluoropropyl)methylsiloxy; the reinforcing filler is a microparticulate silica; the organohydrogenpolysiloxane of the organohydrogenpolysiloxane/addition reaction catalyst combination is selected from a group consisting of trimethylsiloxy-terminated dimethylsiloxane-methylhydrogensiloxane copolymer, and hydrogendimethylsiloxy-terminated dimethylsiloxane-methylhydrogensiloxane copolymer, and the quantity of organohydrogenpolysiloxane is in a range that provides 0.6 to 5.0 moles of silicon-bonded hydrogen atoms for each mole of silicon-bonded alkenyl group in component (A); the addition reaction catalyst of the organohydrogenpolysiloxane/addition reaction catalyst combination is selected from a group consisting of platinum, platinum black, chloroplatinic acid, platinum tetrachloride, chloroplatinic acid/olefin complexes, chloroplatinic acid/methylvinylsiloxane complexes, microparticulate thermoplastic catalyst containing platinum, microparticulate thermoplastic catalyst containing a platinum compound, a rhodium compound, and cobalt carbonyl, and the quantity of the addition reaction catalyst is in a range of about 0.1 to 100 weight parts per one million weight parts of component (A).

6. An oil-resistant silicone rubber composition according to claim 1, wherein the curing agent is an organoperoxide.

7. An oil-resistant silicone rubber composition according to claim 6, wherein the diorganopolysiloxane oil is selected from a group consisting of trimethylsiloxy-terminated dimethylpolysiloxane, trimethylsiloxy-terminated methyloctylpolysiloxane, trimethylsiloxy-terminated methylphenylpolysiloxane, trimethylsiloxy-terminated 3,3,3-trifluoropropylmethylpolysiloxane, and trimethylsiloxy-terminated copolymer oil having units selected from a group consisting of dimethylsiloxane, methyloctylsiloxane, methylphenylsiloxane, and 3,3,3-trifluoropropylmethylsiloxane units.

8. An oil-resistant silicone rubber composition according to claim 7, wherein 3,3,3-trifluoropropylmethylsiloxane units comprise a mole percent of the dimethylsiloxane-3,3,3-trifluoropropylmethylsiloxane-methylvinylsiloxane copolymer gum in a range of about 5 to 95; molecular chain end groups of the dimethylsiloxane-3,3,3-trifluoropropylmethylsiloxane-methylvinylsiloxane copolymer gum are selected from a group consisting of trimethylsiloxy, dimethylvinylsiloxy, hydroxydimethylsiloxy, and hydroxy(3,3,3-trifluoropropyl)methylsiloxy; the reinforcing filler is a microparticulate silica; the organoperoxide is selected from a group consisting of 2,5-dimethyl-2,5-di(tert-butylperoxy)hex-3-yne, 2,5-dimethyl-2,5-di(tert-butylperoxy)hexane, 2,2'-bis(tert-butylperoxy)-p-diisopropylbenzene, dicumyl peroxide, di-tert-butyl peroxide, tert-butyl perbenzoate, 1,1-bis(tert-butylperoxy)-3,3,5-trimethylcyclohexane, 2,4-dichlorobenzoyl peroxide, benzoyl peroxide, and p-chlorobenzoyl peroxide; the quantity of diorganopolysiloxane oil is in a range of about 5 to 50 weight parts per 100 weight parts of component (A); and the diorganopolysiloxane oil comprises a weight percent of the composition in a range of about 4 to 20.

* * * * *